(12) United States Patent
Hoffmeier

(10) Patent No.: US 7,093,720 B2
(45) Date of Patent: Aug. 22, 2006

(54) FILTER DEVICE FOR GARDEN PONDS OR SIMILAR

(75) Inventor: Dieter Hoffmeier, Ibbenbüren (DE)

(73) Assignee: Oase Wübker GmbH & Co. KG, Hörsel (DE)

( * ) Notice: Subject to any disclaimer, the term of this patent is extended or adjusted under 35 U.S.C. 154(b) by 12 days.

(21) Appl. No.: 10/488,035

(22) PCT Filed: Aug. 28, 2002

(86) PCT No.: PCT/DE02/03163

§ 371 (c)(1),
(2), (4) Date: Mar. 19, 2004

(87) PCT Pub. No.: WO03/024560

PCT Pub. Date: Mar. 27, 2003

(65) Prior Publication Data

US 2005/0011825 A1    Jan. 20, 2005

(30) Foreign Application Priority Data

Aug. 30, 2001 (DE) ................................ 101 42 092

(51) Int. Cl.
*B01N 29/66* (2006.01)
(52) U.S. Cl. ...................................... 210/350; 210/351
(58) Field of Classification Search ........ 210/350–352, 210/409, 416.1, 411, 412, 424–426
See application file for complete search history.

(56) References Cited

U.S. PATENT DOCUMENTS

| 953,637 A | * | 3/1910 | McCollom | .................. 210/423 |
| 1,758,412 A | | 5/1930 | Sheppy | |
| 4,350,590 A | | 9/1982 | Robinson | |

FOREIGN PATENT DOCUMENTS

| DE | 101 01 313 A1 | 7/2001 |
| EP | 0 259 000 B1 | 3/1988 |
| GB | 1 282 217 | 7/1972 |
| JP | 60038010 | 2/1985 |

OTHER PUBLICATIONS

Bulletin for bioforce filter system, 2002.

* cited by examiner

*Primary Examiner*—Fred G. Prince
(74) *Attorney, Agent, or Firm*—Cohen, Potani, Lieberman & Pavane

(57) ABSTRACT

A filter device for filtering flowing liquids comprises a compressible filter medium in a vessel and a device by which the filter medium can be compressed by means of an actuation handle, so that impurities can be pressed out of the filter medium. In addition, the filter device contains a multipath regulator which can be adjusted for filtering, back-rinsing and clear-rinsing by means of three flow paths. It is also possible for the filter device to be outfitted exclusively with a multipath regulator or a compressing device.

23 Claims, 4 Drawing Sheets

FILTER DEVICE FOR GARDEN PONDS OR SIMILAR

PRIORITY CLAIM

This is a U.S. national stage of application No. PCT/DE02/03163, filed on 28 Aug. 2002. Priority is claimed on that application and on the following application(s): Country: Germany, Application No.: 101 42 092.7, Filed: 30 Aug. 2001.

BACKGROUND OF THE INVENTION

1. Field of the Invention

The present invention is directed to a filter device for filtering flowing liquids including a vessel, a compressible filter medium which is arranged in the vessel along a central flow channel or conduit and between an inlet area and an outlet area in the main flow direction, and with a vessel cover in which the inlet area and the outlet area are integrated.

2. Description of the Prior Art

A filter device of the type mentioned above is known in general from the prior art. Filter devices of this type have the disadvantage that they are difficult to clean. The filter devices are used in ponds to filter suspended matter out of the pond water. Therefore, the filter medium becomes stopped up with impurities over time, so that it is necessary to clean the filter medium. In order to clean the filter medium in prior art filter devices, it is necessary to disassemble the filter device and to clean the filter medium while it is removed from the filter device.

This process is time-consuming, complicated and can also result in damage to the filter device and filter medium.

SUMMARY OF THE INVENTION

Therefore, it is the object of the present invention to provide a filter device of the type mentioned above which is simple to clean and does not need to be disassembled for the purpose of cleaning.

This object is met in that a central flow conduit is constructed with a first holding surface for the filter medium upstream and with a second holding surface for the filter medium downstream, wherein the first holding surface and the second holding surface are in operative connection with one another by an actuating element such that the relative distance between the two holding surfaces can be varied.

With the present invention, it is now possible to compress and decompress the filter medium in its working position when needed by changing the distance between the holding surfaces. By compressing, impurities in the filter medium are pressed out along with the liquid present in the filter medium and enter the central flow conduit.

The distance between the two holding surfaces can be reduced selectively by pressing the upper holding surface in the direction of the lower holding surface or by pulling the lower holding surface in the direction of the upper holding surface.

The cleaning of the filter device according to the invention by compressing the filter medium is advantageously supported by a multifunction regulator. The multifunction regulator allows the flowing medium to flow on three flow paths through the filter device. The normal main flow path allows filtering of the flowing medium, a second flow path allows back-rinsing of the filter device and a third flow path allows clear-rinsing of the filter device. In addition, the arrangement of the multifunction regulator in the vessel cover of the filter device allows the multifunction regulator to be manufactured with tolerances because possible small leaks occur in the interior of the vessel due to dimensional tolerances and do not present any disadvantages to be prevented. In addition, costly pipe laying can be dispensed with due to the flow paths in the vessel cover.

The above-stated object is further met in that the outlet area has a first runoff opening to a pond and a second runoff opening to a conduit and in that a multidirectional or multipath regulator is arranged in the vessel cover and is selectively displaceable in such a way that three flow paths can be adjusted:

1. Main filtering flow path: inlet area, filter medium, first runoff opening to the pond;
2. Back-rinsing flow path: inlet area, second runoff opening to the conduit;
3. Clear-rinsing flow path: inlet area, filter medium, second runoff opening to the conduit.

BRIEF DESCRIPTION OF THE DRAWINGS

An embodiment form of the present invention will be described more fully in the following with reference to the drawings.

DETAILED DESCRIPTION OF THE PREFERRED EMBODIMENTS

Figure 1:
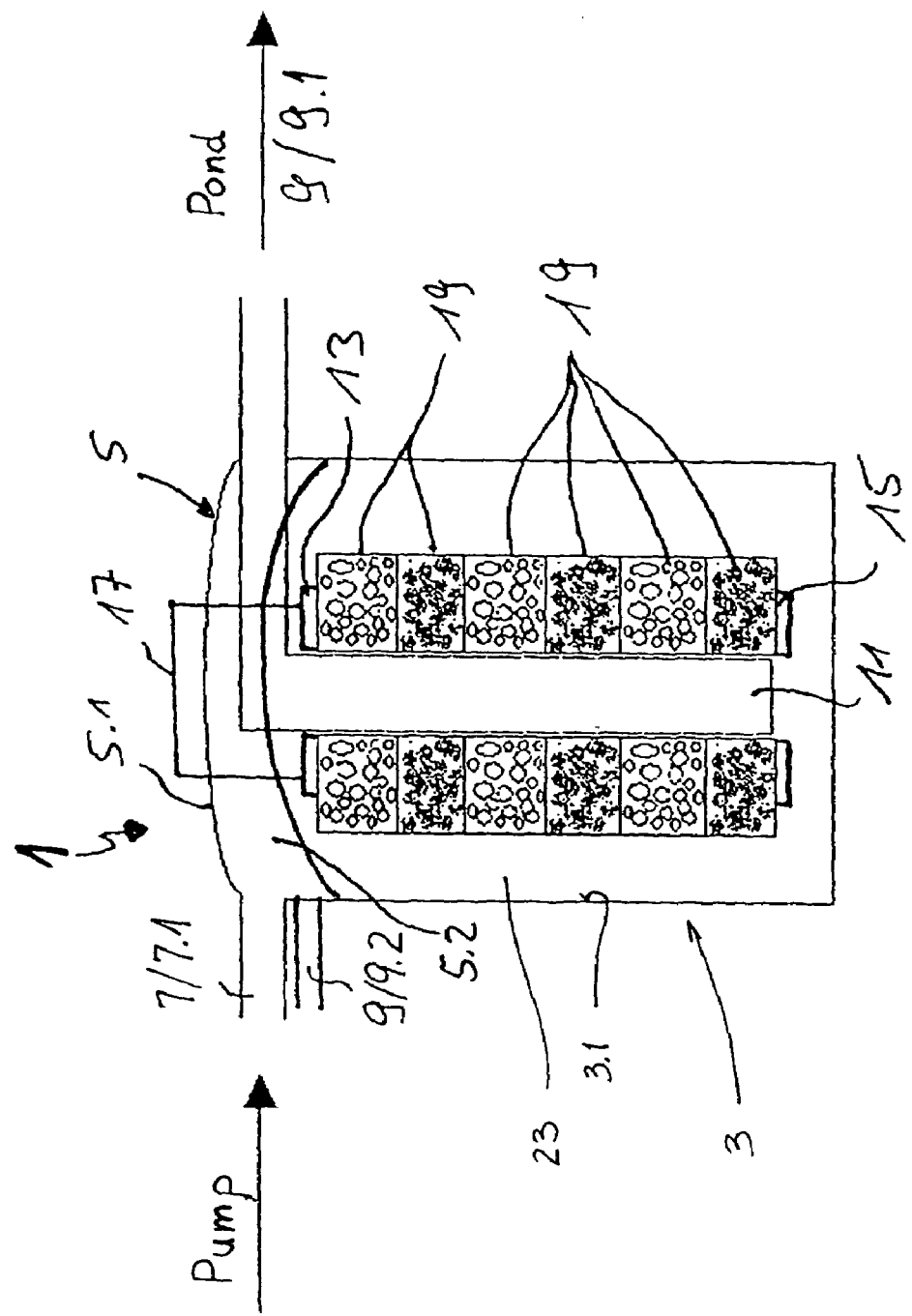
FIG. 1 is a schematic side view in partial section showing a filter device according to the invention in which the flow paths are shown.

A filter device 1 comprises a vessel 3 and a vessel cover 5. An inlet area 7 and an outlet area 9 are formed in the vessel cover 5. The outlet area 9 comprises a first runoff opening 9.1 to a pond and a second runoff opening 9.2 to a conduit. The inlet area 7 comprises an inlet opening 7.1 which is connected to a pump by a hose, a line or the like and by which fluid, e.g., the pond water to be filtered, can be pumped into the filter device 1. A central flow conduit 11 is formed as a filter connection piece in the vessel 3, i.e., the circumference of the filter connection piece is slotted, perforated or the like to allow a flow of liquid from the filter medium 19 (described below) through the sides of the filter connection piece.

Figure 2:
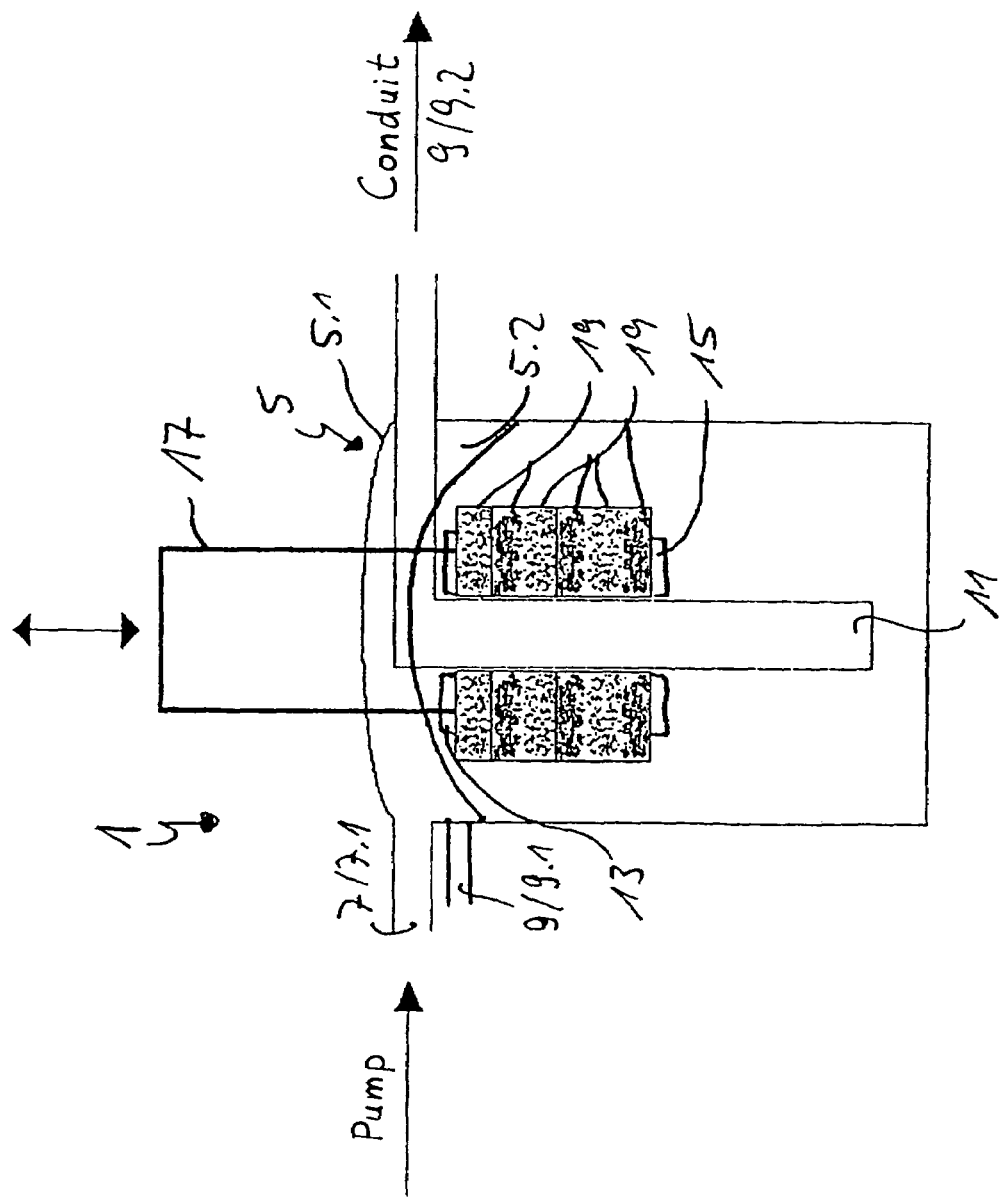
FIG. 2 is a schematic view of the filter device in FIG. 1, wherein an actuating element is actuated for decreasing the distance between two holding surfaces.

In the vicinity of the vessel cover 5, that is, at the top in FIG. 1, an upper, first holding surface 13 is arranged in a stationary manner proximate the upstream end of the central flow conduit 11. At the bottom, i.e., at a downstream end, of the central flow conduit 11, a lower, second holding surface 15 is arranged such that the lower holding surface can slide along the circumference of the central flow conduit 11. An actuating element 17 is fixedly connected to the lower holding surface 15 and is guided at the upper holding surface 13 and outward through the vessel cover 5. By actuating the actuating element 17 (see FIG. 2), the lower, second holding surface 15 can be pulled along the central flow conduit 11 toward the first holding surface 13, so that the distance between the two holding surfaces 13, 15 is reduced. In this way, the filter medium 19 which is arranged concentric to the central flow conduit 11 and between the holding surfaces 13 and 15 is compressed. The filter medium 19 is, e.g., an open-cell material which is suitable for filter functions and is compressible, e.g., a natural or synthetic cellular material.

In another embodiment form, the upper, first holding surface 13 can also be arranged so as to be longitudinally displaceable at the circumference of the central flow conduit 11 and the lower, second holding surface 15 is fixedly arranged at the circumference of the central flow conduit 11. In this case, the actuating element 17 is then also fixedly connected to the upper, first holding surface 13, so that the first, upper holding surface 13 can be pushed in the direction of the lower, second holding surface 15 by actuating the actuating element 17.

In other embodiment forms, it is conceivable that the first holding surface 13 is formed by the vessel cover 5 in case of actuation by pulling and that the second holding surface 15 is formed by the vessel bottom in case of actuation by pushing.

Figure 3A:
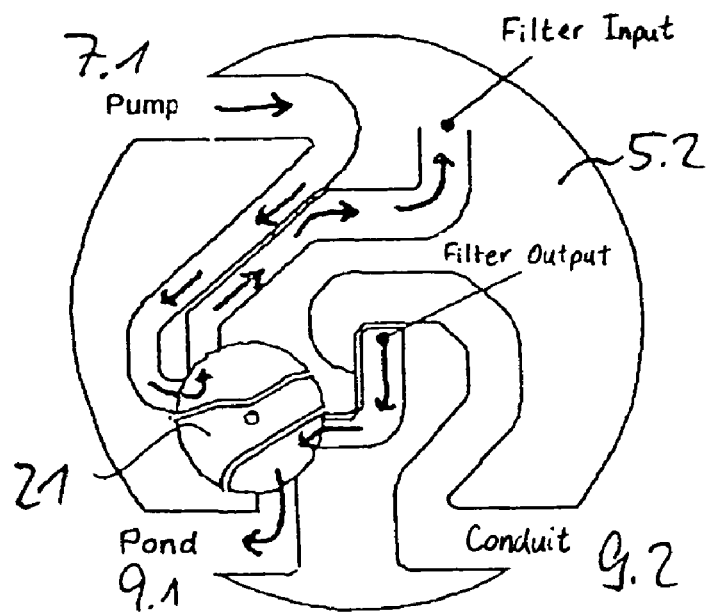
FIGS. 3a, 3b and 3c show schematic top views of a multifunction regulator according to the present invention in three different positions.

The vessel cover 5 has an upper cover 5.1 and a lower cover 5.2. A multipath regulator 21 (FIG. 3) is arranged in the lower cover 5.2. The multipath regulator 21 serves for selective adjustment of three flow paths. For this purpose, flow conduits (not shown) are also formed in the lower cover 5.2. In other embodiment forms, the multipath regulator 21 and the flow conduits can also be constructed in the upper cover 5.1.

Figure 3B:
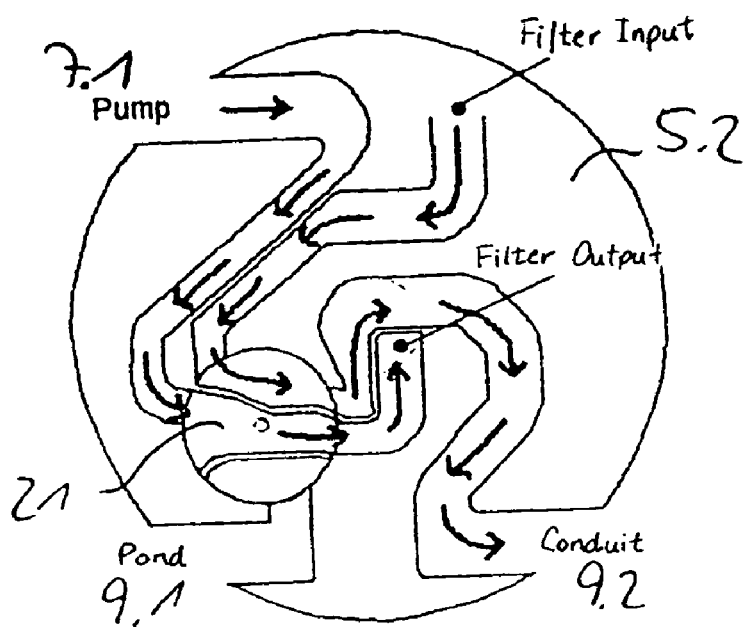
Figure 3C:
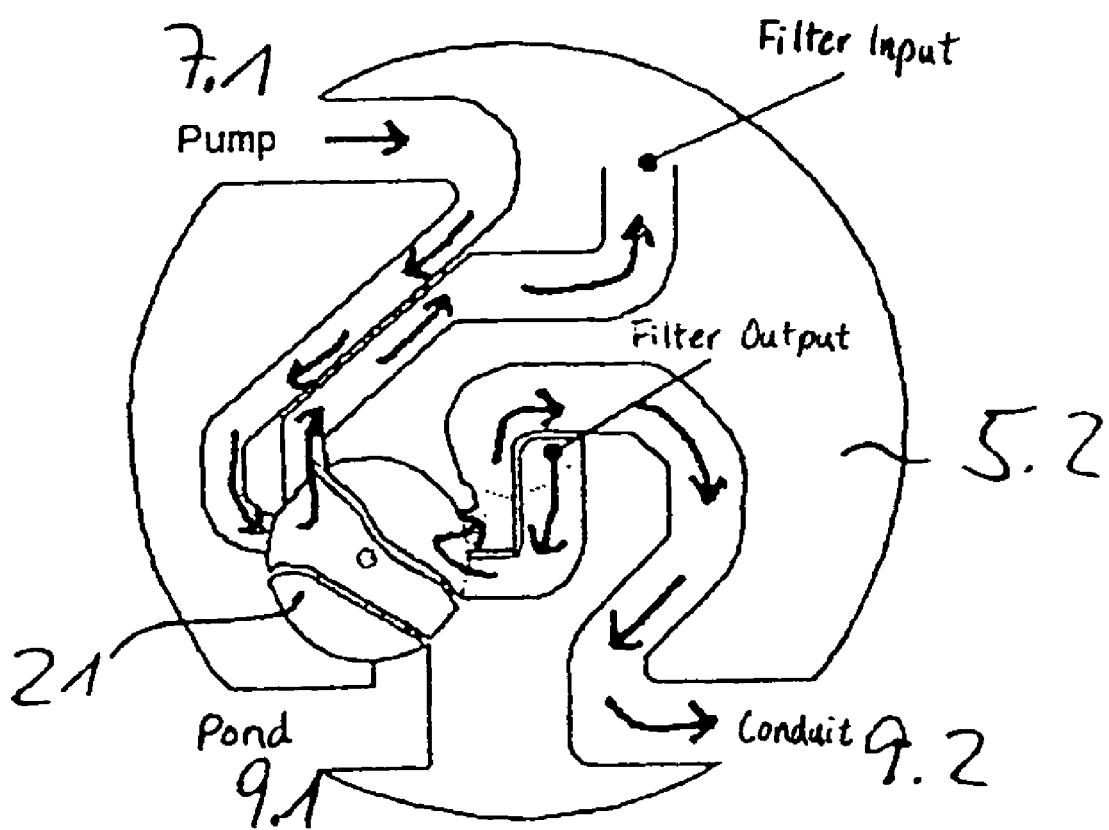

In a first position of the multipath regulator 21 (FIG. 3a), a main flow path is adjusted by which a liquid to be filtered is guided back to its starting point, e.g., pond water is guided back into a pond, through the first runoff opening 9.1 after filtering. In FIG. 3b, a second flow path is adjusted in which a flowing medium is directed via the second runoff opening 9.2 into a conduit. This position is used for back-rinsing the filter device 1. In FIG. 3c a third flow path is adjusted in which a flowing medium is likewise directed through the second runoff opening 9.2 into a conduit. This flow path is used for clear-rinsing the filter device 1.

The installation of the multipath regulator 21 in the vessel cover 5 allows a certain leakage to occur in the multipath regulator 21 which comprises cock taps. This leakage remains in the vessel 3 and reaches the first or second runoff opening 9.1, 9.2 by one of the plurality of paths.

The vessel 3 has an inner wall 3.1, the filter medium 19 is disposed at a distance therefrom. Therefore, a flow conduit 23 is formed between the filter medium 19 and the inner wall 3.1. This flow conduit 23 extends along the entire height of the filter medium 19 and runs concentric to the central flow conduit 11.

In an alternative embodiment form, the cleaning can be carried out chiefly through actuation of the multipath regulator 21 and can be supported through the holding surfaces 13, 15 and the actuating element 17.

What is claimed is:

1. A filter device for filtering a flowing liquid, comprising:
   a vessel;
   a vessel cover defining an inlet area and an outlet area;
   a central flow conduit arranged in said vessel between said inlet area and said outlet area and having an upstream end and a downstream end relative to a main filtering flow path from the inlet area to the outlet area;
   a compressible filter medium arranged in said vessel along said central flow conduit;
   a first holding surface supporting an end of said compressible filter medium proximate said upstream end of said central flow conduit;
   a second holding surface supporting another end of said compressible filter medium proximate said downstream end of said central flow conduit; and
   an actuator connected to said first and second holding surfaces and movable between first and second positions for changing a distance between said first and second holding surfaces, whereby said filter medium is compressible in response to the relative movement of said first and second holding surfaces.

2. The filter device of claim 1, wherein a flow conduit which completely encloses said filter medium is defined between an inner wall of said vessel and said filter medium concentric to said central flow conduit.

3. The filter device of claim 1, wherein said actuating element is a pull element, said actuating element being fixed to said second holding surface and guided at said first holding surface.

4. The filter device of claim 3, wherein said second holding surface is slidable relative to said central flow conduit.

5. The filter device of claim 1, wherein said central flow conduit is a filter connection piece.

6. The filter device of claim 1, wherein said outlet area includes a first runoff opening to a pond and a second runoff opening connected to a conduit.

7. The filter device of claim 6, further comprising a multipath regulator arranged in said vessel cover and selectively displaceable for actuating one of first, second, and third flow paths, wherein
   said first flow path comprises the main filtering flow path through said inlet area, said filter medium, and said first runoff opening to the pond;
   said second flow path comprises a back-rinsing flow path through said inlet area and said second runoff opening to said conduit; and
   said third flow path comprises a back-rinsing flow path through said inlet area, said filter medium, and said second runoff opening to said conduit.

8. The filter device of claim 7, wherein said multipath regulator comprises a cock tap.

9. The filter device of claim 7, wherein said vessel cover has an upper cover and a lower cover and is constructed with flow conduits to said first and second runoff opening, and said multipath regulator is arranged in one of said lower cover and said upper cover.

10. The filter device of claim 1, wherein said vessel cover has an upper cover and a lower cover and is constructed with flow conduits to said first and second runoff opening.

11. The filter device of claim 1, wherein said first holding surface comprises a portion of said vessel cover.

12. The filter device of claim 1, wherein said second holding surface comprises a portion of a vessel bottom.

13. A filter device for filtering a flowing liquid, comprising:
    a vessel;
    a vessel cover defining an inlet area and an outlet area, wherein said outlet area includes a first runoff opening to a pond and a second runoff opening connected to a conduit;
    a central flow conduit arranged in said vessel between said inlet area and said outlet area and having an upstream end and a downstream end relative to a main filtering flow path from the inlet area to the outlet area;
    a compressible filter medium arranged in said vessel along said central flow conduit; and a multipath regulator arranged in said vessel cover and selectively displaceable for actuating one of first, second, and third flow paths, wherein said first flow path comprises the main filtering flow path through said inlet area, said filter medium, and said first runoff opening to the pond;

said second flow path comprises a back-rinsing flow path through said inlet area and said second runoff opening to said conduit; and said third flow path comprises a back-rinsing flow path through said inlet area, said filter medium, and said second runoff opening to said conduit.

14. The filter device of claim 13, wherein said multipath regulator comprises a cock tap.

15. The filter device of claim 13, wherein said vessel cover comprises an upper cover and a lower cover.

16. The filter device of claim 15, wherein said multipath regulator is arranged in said lower cover.

17. The filter device of claim 13, further comprising:

a first holding surface supporting an end of said compressible filter medium proximate said upstream end of said central flow conduit;

a second holding surface supporting another end of said compressible filter medium proximate said downstream end of said central flow conduit; and an actuator connected to said first and second holding surfaces and movable between first and second positions for changing a distance between said first and second holding surfaces, whereby said filter medium is compressible in response to the movement of said first and second holding surfaces.

18. The filter device of claim 17, wherein said actuating element is a pull element, said actuating element being fixed to said second holding surface and guided at said first holding surface.

19. The filter device of claim 17, wherein said second holding surface is slidable relative to said central flow conduit.

20. The filter device of claim 17, wherein said first holding surface comprises a part of said vessel cover.

21. The filter device of claim 17, wherein said second holding surface is part of a vessel bottom.

22. The filter device of claim 13, wherein a flow conduit which completely encloses said filter medium is defined between an inner wall of said vessel and said filter medium concentric to said central flow conduit.

23. The filter device of claim 13, wherein said central flow conduit is a filter connection piece.

* * * * *